(12) United States Patent
Lynch et al.

(10) Patent No.: US 7,970,570 B2
(45) Date of Patent: Jun. 28, 2011

(54) METHODS AND SYSTEMS FOR ANALYSIS OF COMBUSTION DYNAMICS IN THE TIME DOMAIN

(75) Inventors: John J. Lynch, Pleasanton, CA (US); John C. Intile, Simpsonville, SC (US); Kevin McMahan, Greer, SC (US); Mark W. Pinson, Greer, SC (US); Tapie Rohm, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1468 days.

(21) Appl. No.: 11/549,314

(22) Filed: Oct. 13, 2006

(65) Prior Publication Data
US 2008/0091379 A1   Apr. 17, 2008

(51) Int. Cl.
*G06F 19/00* (2006.01)

(52) U.S. Cl. ............................ 702/140; 702/138
(58) Field of Classification Search .......... 702/137, 702/138, 140
See application file for complete search history.

(56) References Cited

U.S. PATENT DOCUMENTS

| | | | |
|---|---|---|---|
| 4,303,885 A | 12/1981 | Davis et al. | |
| 4,922,201 A | 5/1990 | Vernon et al. | |
| 4,924,182 A | 5/1990 | Vernon et al. | |
| 5,182,513 A | 1/1993 | Young et al. | |
| 5,544,478 A | 8/1996 | Shu et al. | |
| 5,809,769 A | 9/1998 | Richards et al. | |
| 5,974,870 A * | 11/1999 | Treinies et al. | 73/114.33 |
| 6,205,764 B1 | 3/2001 | Hermann et al. | |
| 6,742,341 B2 | 6/2004 | Ryan et al. | |
| 6,843,061 B2 | 1/2005 | Parker et al. | |
| 6,898,547 B1 | 5/2005 | DeBlois et al. | |
| 6,938,611 B2 * | 9/2005 | Ismailov | 123/494 |
| 7,113,873 B2 * | 9/2006 | Hoyte et al. | 702/50 |
| 7,292,931 B2 * | 11/2007 | Davis et al. | 701/110 |
| 2006/0225710 A1 * | 10/2006 | Taglialatela-Scafati et al. | 123/486 |
| 2007/0039329 A1 * | 2/2007 | Abreu et al. | 60/776 |
| 2007/0119147 A1 * | 5/2007 | Cornwell et al. | 60/39.281 |
| 2009/0132148 A1 * | 5/2009 | Burkhardt | 701/102 |

OTHER PUBLICATIONS

Wood, Don J., S. Lingireddy, P. Boulos, B. Karney and D. Mc Pherson, Numerical methods for modeling transient flow in distribution systems, Journal of the American Water Works Association, vol. 97, No. 7, pp. 104-115 (Jul. 2005).*

* cited by examiner

*Primary Examiner* — Manuel L Barbee
(74) *Attorney, Agent, or Firm* — Armstrong Teasdale LLP

(57) ABSTRACT

Methods and systems for analyzing combustion dynamics of a combustor system in the time domain are provided. The combustor system includes an inlet pipe coupled in flow communication with a combustion chamber. The method includes determining a characteristic equation of a wave traveling in the inlet pipe, determining an acoustic pressure oscillation in the combustion chamber, and determining a pressure fluctuation in the inlet pipe using the characteristic equation and the determined acoustic pressure oscillation.

20 Claims, 3 Drawing Sheets

METHODS AND SYSTEMS FOR ANALYSIS OF COMBUSTION DYNAMICS IN THE TIME DOMAIN

BACKGROUND OF THE INVENTION

This invention relates generally to combustion dynamics analysis and more particularly, to methods and systems for analyzing combustion dynamics in the time domain.

Currently, combustion dynamics analysis is performed with a variety of approaches including modal analysis of the one-dimensionalized combustion geometry and with three-dimensional transient computational fluid dynamics with chemical reactions, using large eddy simulations. Heretofore, there are no known tools for computing the amplitudes of combustion dynamics, and the current tool being used for combustion dynamics analysis has several significant problems such as being only one-dimensional. Recent test evidence indicates true three-dimensionality of thermoacoustics even at low frequencies, thus violating one of the basic assumptions of this tool. Also, the current tool being used for combustion dynamics analysis can not handle nonlinearities that arise in high-amplitude dynamics, and can not compute amplitudes.

BRIEF DESCRIPTION OF THE INVENTION

In one embodiment, a method for analyzing combustion dynamics of a combustor system in the time domain is provided. The combustor system includes an inlet pipe coupled in flow communication with a combustion chamber. The method includes determining a characteristic equation of a wave traveling in the inlet pipe, determining an acoustic pressure oscillation in the combustion chamber, and determining a pressure fluctuation in the inlet pipe using the characteristic equation and the determined acoustic pressure oscillation.

In another embodiment, a combustion dynamics analysis system includes a database comprising information relating to a combustor system in a gas turbine engine, the combustor system including an inlet pipe coupled in flow communication with a combustion chamber, a processor communicatively coupled to said database, said processor configured to read at least a portion of the information in the database and then determine a characteristic equation of a wave traveling in the inlet pipe, determine an acoustic pressure oscillation in the combustion chamber, determine a pressure fluctuation in the inlet pipe using the characteristic equation and the determined acoustic pressure oscillation, and output an indication of the determined pressure fluctuations.

In yet another embodiment, a combustion dynamics analysis system includes a database comprising information relating to a combustor system in a gas turbine engine, the combustor system including an inlet pipe coupled in flow communication with a combustion chamber, a processor communicatively coupled to said database, said processor configured to read at least a portion of the information in the database and then determine a characteristic equation of a wave traveling in a first direction in the inlet pipe and a wave traveling in a second opposite direction in the inlet pipe. The processor is further configured to determine an acoustic pressure oscillation in the combustion chamber and determine a pressure fluctuation in the inlet pipe using the characteristic equation and the determined acoustic pressure oscillation.

DETAILED DESCRIPTION OF THE INVENTION

While the methods and systems are herein described in the context of a gas turbine engine used in an industrial environment, it is contemplated that the method and systems described herein may find utility in other combustion turbine systems applications including, but not limited to, turbines installed in aircraft. In addition, the principles and teachings set forth herein are applicable to gas turbine engines using a variety of combustible fuels such as, but not limited to, natural gas, liquefied natural gas (LNG), gasoline, kerosene, diesel fuel, jet fuel, and mixtures thereof. The description hereinbelow is therefore set forth only by way of illustration, rather than limitation.

Various embodiments of the present invention use a time domain approach in which the essential physics of waves is included, along with the nonlinear energy losses associate with highly oscillating flow through passages with fluid flow resistance. The thermo-acoustics associated with oscillatory air and fuel flow are included, with three-dimensional crosstalk within the combustion chamber downstream of multiple swozzles conveying air and fuel into a flame region, as well as interactions on the fuel side through the fuel circuit as affected by pressure oscillations caused by fuel oscillations, which in turn cause further fuel oscillations because of time-varying pressure drop across the post-orifice of the fuel circuit.

Figure 1:
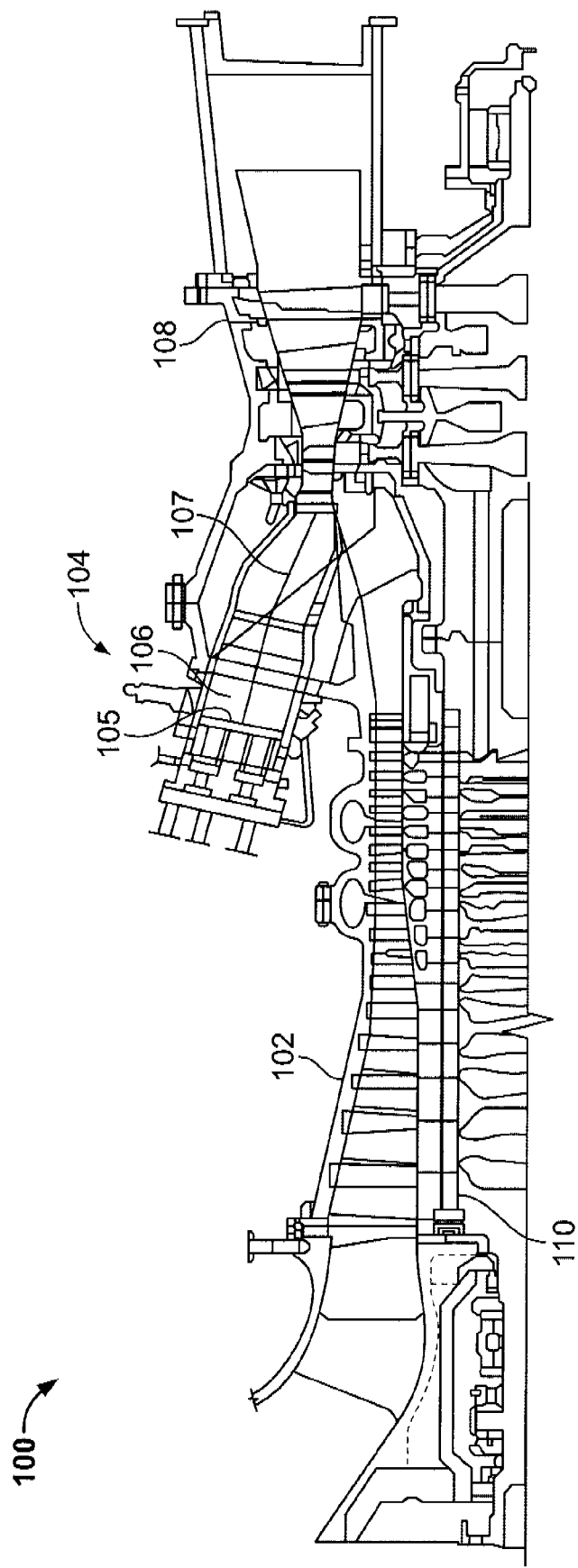
FIG. 1 is a schematic illustration of an exemplary gas turbine engine in accordance with an embodiment of the present invention.

FIG. 1 is a schematic illustration of an exemplary gas turbine engine 100 in accordance with an embodiment of the present invention. Engine 100 includes a compressor 102 and a combustor assembly 104. Combustor assembly 104 includes a combustor assembly inner wall 105 that at least partially defines a combustion chamber 106. Combustion chamber 106 has a centerline 107 that extends therethrough. In the exemplary embodiment, engine 100 includes a plurality of combustor assemblies 104. Combustor assembly 104 and, more specifically, combustion chamber 106 is coupled downstream from and in flow communication with compressor 102. Engine 100 also includes a turbine 108 and a compressor/turbine shaft 110 (sometimes referred to as rotor 110). In the exemplary embodiment, combustion chamber 106 is substantially cylindrical and is coupled in flow communication with turbine 108. Turbine 108 is rotatably coupled to, and drives, rotor 110. Compressor 102 is also rotatably coupled to shaft 110.

In operation, air flows through compressor 102 and a substantial amount of compressed air is supplied to combustor assembly 104. Assembly 104 is also in flow communication with a fuel source (not shown in FIG. 1) and channels fuel and air to combustion chamber 106. In the exemplary embodiment, combustor assembly 104 ignites and combusts fuel, for example, synthetic gas (syngas) within combustion chamber 106 that generates a high temperature combustion gas stream (not shown in FIG. 1) of approximately 1316° Celsius (C.) to 1593° C. (2400° Fahrenheit (F.) to 2900° F.). Alternatively, assembly 104 combusts fuels that include, but are not limited to natural gas and/or fuel oil. Combustor assembly 104 channels the combustion gas stream to turbine 108 wherein gas stream thermal energy is converted to mechanical rotational energy.

Figure 2:
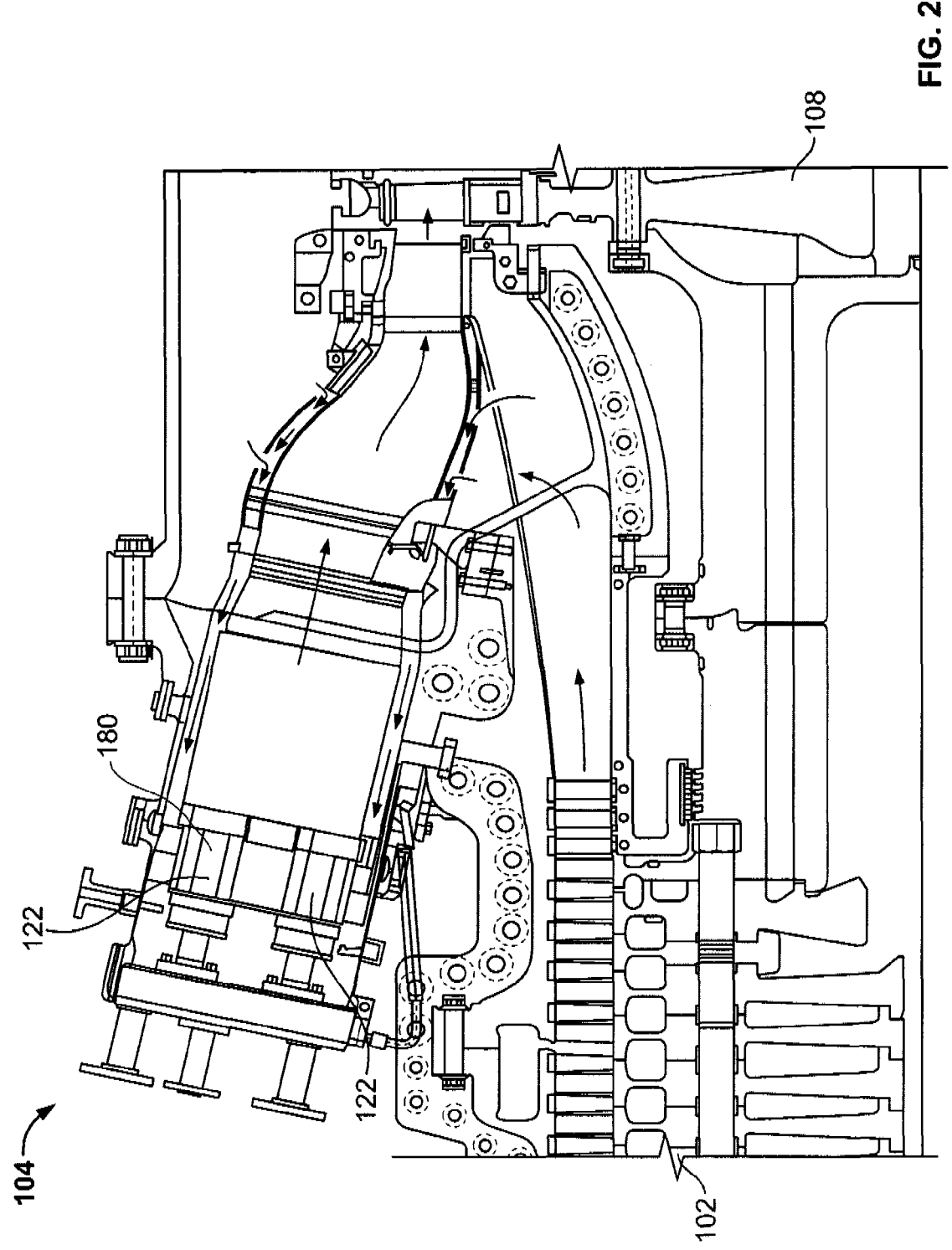
FIG. 2 is a simplified schematic diagram of a combustor including a swozzle.

FIG. 2 is a cross-sectional schematic view of a combustor 104 including a fuel nozzle 122. In an exemplary embodiment, an air atomized liquid fuel nozzle (not shown) is coupled to fuel nozzle 122 to provide dual fuel capability and has been omitted for clarity. Further, fuel nozzle 122 includes a centerline axis and is coupled to an endcover via a fuel nozzle flange.

In the exemplary embodiment, fuel nozzle 122 includes a convergent tube that is coupled to the fuel nozzle flange. The convergent tube includes a radially outer surface. Fuel nozzle 122 also includes a radially inner tube that is coupled to the fuel nozzle flange via a tube-to-flange bellows. The tube-to-flange bellows facilitates compensating for varying rates of thermal expansion between the convergent tube and the fuel nozzle flange. In the exemplary embodiment, the convergent tube and the radially inner tube define a substantially annular first premixed fuel supply passage. Further, in the exemplary embodiment, fuel nozzle 122 includes a substantially annular inner tube that defines a second premixed fuel supply passage in cooperation with the radially inner tube. The annular inner tube partially defines a diffusion fuel passage and is coupled to the fuel nozzle flange via an air tube-to-flange bellows that facilitates compensating for varying rates of thermal expansion between the annular inner tube and the fuel nozzle flange. The above-described passages are coupled in flow communication to fuel sources. For example, in the exemplary embodiment, the diffusion fuel passage receives the air atomized liquid fuel nozzle therein.

In the exemplary embodiment, fuel nozzle 122 includes a substantially annular inlet flow conditioner (IFC). The IFC includes a radially outer wall that includes a plurality of perforations, and an end wall that is positioned on an aft end of the IFC and extends between the outer wall and the radially outer surface of the convergent tube. The radially outer wall and the end wall of the IFC and the radially outer surface of the convergent tube define a substantially annular IFC chamber therein. The IFC chamber is in flow communication with a cooling passage via the perforations. In the exemplary embodiment, fuel nozzle 122 also includes a tubular transition piece that is coupled to the radially outer wall of the IFC. The transition piece defines a substantially annular transition chamber that is substantially concentrically aligned with respect to the annular IFC chamber and is positioned such that an IFC outlet passage extends between the annular IFC chamber and the annular transition chamber.

In the exemplary embodiment, fuel nozzle 122 also includes an air swirler assembly or swozzle assembly 180 for use with gaseous fuel injection. A swozzle is a combination of a swirler and a nozzle, with an additional nozzle in the center. The swozzle includes a substantially tubular shroud that is coupled to the tubular transition piece, and a substantially tubular hub that is coupled to the convergent tube, the radially inner tube, and the annular inner tube. The shroud and the hub define an annular chamber therein wherein a plurality of hollow turning vanes extend between the shroud and the hub. The annular chamber is coupled in flow communication with the annular transition chamber of the IFC. The hub defines a plurality of primary turning vane passages that are coupled in flow communication with the premixed fuel supply passage. A plurality of premixed gas injection ports are defined within the hollow turning vanes. Similarly, the hub defines a plurality of secondary turning vane passages that are coupled in flow communication with the premixed fuel supply passage and a plurality of secondary gas injection ports that are defined within turning vanes. The inlet chamber, and the primary and secondary gas injection ports, are coupled in flow communication with an outlet chamber.

In the exemplary embodiment, fuel nozzle 122 further includes a substantially annular fuel-air mixing passage that is defined by a tubular shroud extension and a tubular hub extension. The annular fuel-air mixing passage is coupled in flow communication with the outlet chamber and the tubular shroud extension and the tubular hub extension are each coupled to the shroud and the hub, respectively.

In the exemplary embodiment, a tubular diffusion flame nozzle assembly is coupled to the hub and partially defines the annular diffusion fuel passage. The tubular diffusion flame nozzle assembly also defines an annular air passage in cooperation with the hub extension. Fuel nozzle 122 also includes a slotted gas tip that is coupled to the hub extension and the tubular diffusion flame nozzle assembly, and that includes a plurality of gas injectors and air injectors. The tip is coupled in flow communication with, and facilitates fuel and air mixing in, combustion chamber 128.

In operation, fuel nozzle 122 receives compressed air from a cooling passage via a plenum surrounding fuel nozzle 122. Most of the air used for combustion enters fuel nozzle 122 via the IFC and is channeled to premixing components. Specifically, air enters the IFC via the perforations and mixes within the annular IFC chamber and air exits the IFC via the IFC outlet passage and enters the swozzle inlet chamber via the transition piece chamber. A portion of high pressure air entering the cooling passage is also channeled into an air-atomized liquid fuel cartridge.

Fuel nozzle 122 receives fuel from a fuel source via the premixed fuel supply passages. Fuel is channeled from the first premixed fuel supply passage to the plurality of primary gas injection ports defined within the turning vanes. Similarly, fuel is channeled from the second premixed fuel supply passage to the plurality of secondary gas injection ports defined within the turning vanes.

Air channeled into the swozzle inlet chamber from the transition piece chamber is swirled via the turning vanes and is mixed with fuel, and the fuel/air mixture is channeled to the swozzle outlet chamber for further mixing. The fuel and air mixture is then channeled to the mixing passage and discharged from fuel nozzle 122 into a combustion chamber. In addition, diffusion fuel channeled through the diffusion fuel passage is discharged through the gas injectors into the combustion chamber wherein it mixes and combusts with air discharged from the air injectors.

Figure 3:
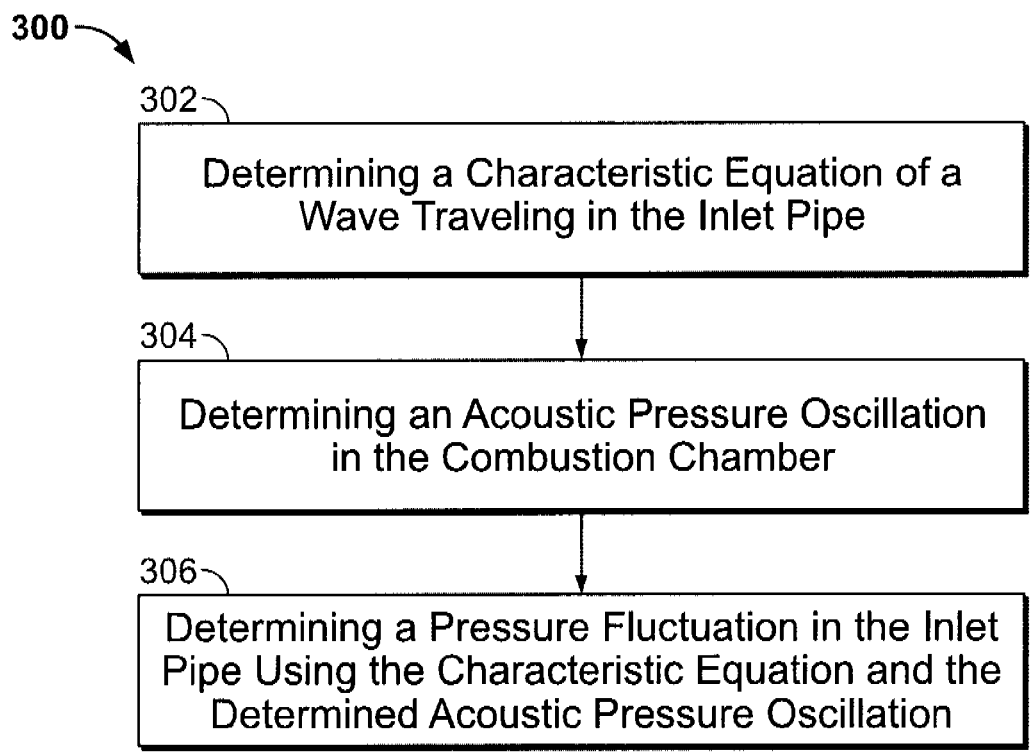
FIG. 3 is a flow diagram of an exemplary method of facilitating computing combustion dynamics, in the time domain, with the ability to determine a nonlinear behavior of piping devices such as orifices, in a multi-dimensional geometry.

FIG. 3 is a flow diagram of an exemplary method 300 of facilitating computing combustion dynamics, in the time domain, with the ability to determine a nonlinear behavior of piping devices such as orifices, in a multi-dimensional geometry.

In the exemplary embodiment, the method of characteristics is used to compute the fluid transients, and basic thermodynamics is used to compute the pressure oscillations in the flame associated with fuel/air flow oscillations.

The method of characteristics is normally a one-dimensional computational method, used for example, to analyze transient flow through a pipe, such as waterhammer. By superposing one-dimensional elements on each other in different directions, with appropriate branching among these elements in different directions, multi-dimensional transients are analyzed. For a first-order partial differential equation (PDE), the method of characteristics determines lines (called characteristic lines or characteristics) along which the PDE degenerates into an ordinary differential equation (ODE). Once the ODE is found it can be solved and transformed into a solution for the original PDE.

In the exemplary embodiment, the essential physics of a gas turbine engine combustor is utilized without resorting to a large-scale CFD model using Large Eddy Simulation (LES), with the consequent need for very fine mesh with associated computational resources. The present method captures acoustic interactions among the fuel passages in swozzles, interacting with the acoustic pressure oscillations in the combustion chamber.

Others have provided some details of the method of characteristics for general fluid transients. In the exemplary embodiment, the use of fluid transients technology is related to combustors, by relating the oscillating fuel and air flow to pressure/temperature oscillations at the flame front, with computation of ensuing feedback effects among pressures and flow rates in fuel, air, and products of combustion, including such effects as far upstream and downstream as fluid transients/acoustic waves may propagate and interact with the combustor.

Each swozzle has its own flame, and these flames are considered to interact acoustically with each other through modeling branches with other swozzle flames. The flame front is the recipient of the mass flow fluctuations in the fuel system, and responds in temperature and pressure fluctuations. In the exemplary embodiment, a relatively high Dahmkohler number, or very fast chemistry relative to the fluctuations in the flow rate is assumed.

With infinitely fast chemistry, and with a flame fixed in one plane, of flame thickness contained within a distance less than one length $\Delta x = a\Delta t$ (a is the local speed of sound at flame conditions), a control volume of length $\Delta x$ and a cross sectional area taken as the cross section of the liner divided by the number of swozzles is considered. Because of the speed of propagation of information, or the speed of sound, in this analysis (except for radiation, which is probably not a major contributor) nothing outside of this control volume may affect this control volume. Temperature changes inside this control volume change the speed of sound, as sound speed is proportional to the square root of absolute temperature, which affects the length of the control volume.

The heat capacity of this control volume (temperature change caused by energy release change) is given by:

$$HC = \frac{\rho C_v A_{Liner} \Delta x}{\text{Nozzle\_Count}}$$

and the change in energy from nominal is:

$$\Delta E = (\dot{m} - \dot{m}_{average})h_r \Delta t$$

that is, the difference in mass flow rate from average, multiplied by the reaction enthalpy, multiplied by the time elapsed.

The temperature rise is then, with $\Delta x = a\Delta t$, $$\Delta T = \frac{\Delta E}{HC} = \frac{(\dot{m} - \dot{m}_{average})h_r \Delta t}{\left(\frac{\rho C_v A_{Liner} a \Delta t}{\text{Nozzle\_Count}}\right)}$$

or $$\Delta T = \frac{\Delta E}{HC}$$
$$= \frac{(\dot{m} - \dot{m}_{average})h_r}{\rho C_v A_{Liner} a}$$
$$= \text{Nozzle\_Count}$$

Pressure is proportional to temperature, so $$\frac{P_{new} - P_0}{P_0} = \frac{T_{new} - T_0}{T_0} = \frac{\Delta T}{T_0}$$

$$Pnew = \frac{P_0}{T_0} \Delta T$$

This provides the pressure at each time step at the flame front downstream of each swozzle. It is recognized that the flame responds to the fuel oscillations from a number of time steps ago determined by the air velocity and cross section areas upstream. Nominally, the time delay is computed to be typically about 6 milliseconds in an example, which translates to about 220 time steps with ½" $\Delta x$.

The model includes three parts coupled together. These are the fuel circuit, the air as it enters the swozzles through the inlet flow conditioners down through the swozzles to the flame front and the region of reactants from the flame front to the end of the transition piece, at which the pressure is assumed for now to be fixed, as an open end.

In the exemplary embodiment, the fuel circuit includes an outer circuit of a production end cover for DLN 2.6, as used in a frame 9FB gas turbine engine, with a plurality of pre-orifices, an annular flow passage to the vanes, and a plurality of post-orifices in the vanes. In the air circuit the pressure upstream of each swozzle is taken to be fixed at discharge pressure of the compressor (PCD).

Figure 4:
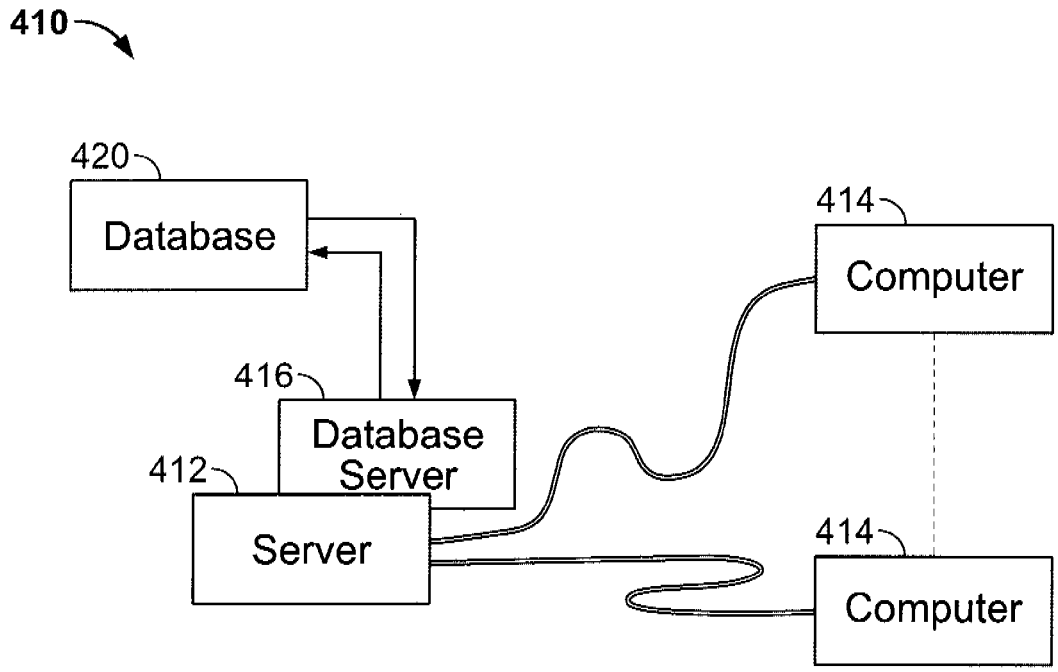
FIG. 4 is a simplified block diagram of a combustion dynamics analysis system (CDAS) including a server system, and a plurality of client sub-systems connected to server system.

FIG. 4 is a simplified block diagram of a combustion dynamics analysis system (CDAS) 410 including a server system 412, and a plurality of client sub-systems, also referred to as client systems 414, connected to server system 412. In one embodiment, client systems 414 are computers including a web browser, such that server system 412 is accessible to client systems 414 using the Internet. Client systems 414 are interconnected to the Internet through many interfaces including a network, such as a local area network (LAN) or a wide area network (WAN), dial-in-connections, cable modems, and special high-speed ISDN lines. Client systems 414 could be any device capable of interconnecting to the Internet including a web-based phone, personal digital assistant (PDA), or other web-based connectable equipment. A database server 416 is connected to a database 420 containing information on a variety of matters, as described herein in greater detail. In one embodiment, centralized database 420 is stored on server system 412 and can be accessed by potential users at one of client systems 414 by logging onto server system 412 through one of client systems 414. In an alternative embodiment, database 420 is stored remotely from server system 412 and may be non-centralized.

The architectures of system 410 as well as various components of system 410 are exemplary only. Other architectures are possible and can be utilized in connection with practicing the processes described above.

A technical effect of the various embodiments of the systems and methods described herein include facilitating the design and operation of gas turbine engines by using essential physics of a gas turbine engine combustor without resorting to a large-scale CFD model using large eddy simulation, with the consequent need for very fine mesh with associated computational resources.

The above-described method of analysis of the time domain interaction among fuel and air flow oscillations and combustion dynamics is cost-effective and highly reliable. The method permits the method of characteristics to be used to compute the fluid transients in piping leading to a combustor, and basic thermodynamics is used to compute the pressure oscillations in the combustor flame associated with the fuel/air flow oscillations. Accordingly, the analysis method facilitates the design and operation of gas turbine engine combustors in a cost-effective and reliable manner.

While the invention has been described in terms of various specific embodiments, those skilled in the art will recognize that the invention can be practiced with modification within the spirit and scope of the claims.

What is claimed is:

1. A method of analyzing combustion dynamics of a combustor system in the time domain, the combustor system including an inlet pipe coupled in flow communication with a combustion chamber, said method performed by a combustion dynamics analysis system (CDAS) including the steps of:
   determining, using the CDAS, a characteristic equation of a wave traveling in the inlet pipe;
   determining further an acoustic pressure oscillation in the combustion chamber;
   determining further a pressure fluctuation in the inlet pipe using the characteristic equation and the determined acoustic pressure oscillation; and
   outputting the determined pressure fluctuation to at least one of a database and a display.

2. A method in accordance with claim 1 wherein determining, using the CDAS, a characteristic equation comprises using a method of characteristics solution to analyze transient flow through the inlet pipe.

3. A method in accordance with claim 1 further comprising determining further a pressure of the wave traveling trough the inlet pipe using a characteristic equation that relates the first pressure at a first location to a second pressure at a second location and a mass flow rate between the first and second location.

4. A method in accordance with claim 3 wherein determining further a pressure of the wave traveling through the inlet pipe using a characteristic equation comprises superposing one-dimensional elements of the wave on each other in different directions to analyze multi-dimensional transients in the inlet pipe.

5. A method in accordance with claim 1 wherein the combustor system includes a plurality of inlet pipes coupled in flow communication with the combustion chamber, said method further comprising determining further an acoustic interaction between the plurality of inlet pipes using a characteristic equation for each of the plurality of inlet pipes.

6. A method in accordance with claim 5 wherein the combustor system includes at least one swozzle including a plurality of fuel passages, said method further comprising determining further an acoustic interaction between the plurality of fuel passages in the at least one swozzle.

7. A method in accordance with claim 6 wherein the combustor system includes at least one swozzle including a plurality of fuel passages, said method further comprising determining further an acoustic interaction between the plurality of fuel passages in the at least one swozzle and the acoustic pressure oscillations in the combustion chamber.

8. A method in accordance with claim 1 wherein determining, using the CDAS, a characteristic equation comprises determining further an equation of a wave traveling in a first direction and a wave traveling in a second opposite direction.

9. A method in accordance with claim 1 wherein the combustor system includes at least one swozzle including a plurality of fuel passages and wherein determining further an acoustic pressure oscillation in the combustion chamber comprises determining further a pressure a time step at a flame front downstream of each swozzle using:

$$P_{new} = \frac{P_0}{T_0}\Delta T,$$

where
$P_{new}$=current pressure
$P_0$=pressure at previous time step
$T_0$=temperature at previous time step, and
$\Delta T$=change in temperature over the time step.

10. A combustion dynamics analysis system comprising:
    a database comprising information relating to a combustor system in a gas turbine engine, the combustor system including an inlet pipe coupled in flow communication with a combustion chamber;
    a processor communicatively coupled to said database, said processor configured to read at least a portion of the information in the database and then:
      determine a characteristic equation of a wave traveling in the inlet pipe;
      determine an acoustic pressure oscillation in the combustion chamber
      determine a pressure fluctuation in the inlet pipe using the characteristic equation and the determined acoustic pressure oscillation; and
      output an indication of the determined pressure fluctuations.

11. A system in accordance with claim 10 wherein said processor is further configured to output a control signal based on the determined fluctuations such that the determined fluctuations are facilitated being reduced in at least one of magnitude and frequency.

12. A system in accordance with claim 10 wherein said processor is further configured to output a control signal to a device that alters a dimension of the inlet pipe.

13. A system in accordance with claim 10 wherein said processor is further configured to determine a pressure of the wave traveling trough the inlet pipe using a characteristic equation that relates a first pressure at a first location to a second pressure at a second location and a mass flow rate between the first and second location.

14. A system in accordance with claim 13 wherein said processor is further configured to superpose a first one-dimensional element of the wave on a second one-dimensional element of the wave in different directions to analyze multi-dimensional transients in the inlet pipe.

15. A system in accordance with claim 10 wherein the combustor system includes a plurality of inlet pipes coupled in flow communication with the combustion chamber, said processor is further configured to determine an acoustic interaction between the plurality of inlet pipes using a characteristic equation for each of the plurality of inlet pipes.

16. A system in accordance with claim 15 wherein the combustor system includes at least one swozzle including a plurality of fuel passages, said processor is further configured to determine an acoustic interaction between the plurality of fuel passages in the at least one swozzle.

17. A system in accordance with claim 16 wherein the combustor system includes at least one swozzle including a plurality of fuel passages, said processor is further configured to determine an acoustic interaction between the plurality of fuel passages in the at least one swozzle and the acoustic pressure oscillations in the combustion chamber.

18. A system in accordance with claim 10 wherein said processor is further configured to determine an equation of a wave traveling in a first direction and a wave traveling in a second opposite direction.

19. A system in accordance with claim 10 wherein the combustor system includes at least one swozzle including a plurality of fuel passages and wherein said processor is further configured to determine a pressure a time step at a flame front downstream of each swozzle using:

$$Pnew = \frac{P_0}{T_0}\Delta T,$$

where
$P_{new}$=current pressure
$P_0$=pressure at previous time step
$T_0$=temperature at previous time step, and
$\Delta T$=change in temperature over the time step.

20. A combustion dynamics analysis system comprising:
a database comprising information relating to a combustor system in a gas turbine engine, the combustor system including an inlet pipe coupled in flow communication with a combustion chamber;
a processor communicatively coupled to said database, said processor configured to read at least a portion of the information in the database and then:
determine a characteristic equation of a wave traveling in a first direction in the inlet pipe and a wave traveling in a second opposite direction in the inlet pipe;
determine an acoustic pressure oscillation in the combustion chamber, and
determine a pressure fluctuation in the inlet pipe using the characteristic equation and the determined acoustic pressure oscillation.

* * * * *